Dec. 22, 1964     D. J. ANDERSON     3,162,710
INDUCTION FURNACE WITH REMOVABLE CRUCIBLE
Filed July 24, 1962                        2 Sheets-Sheet 1
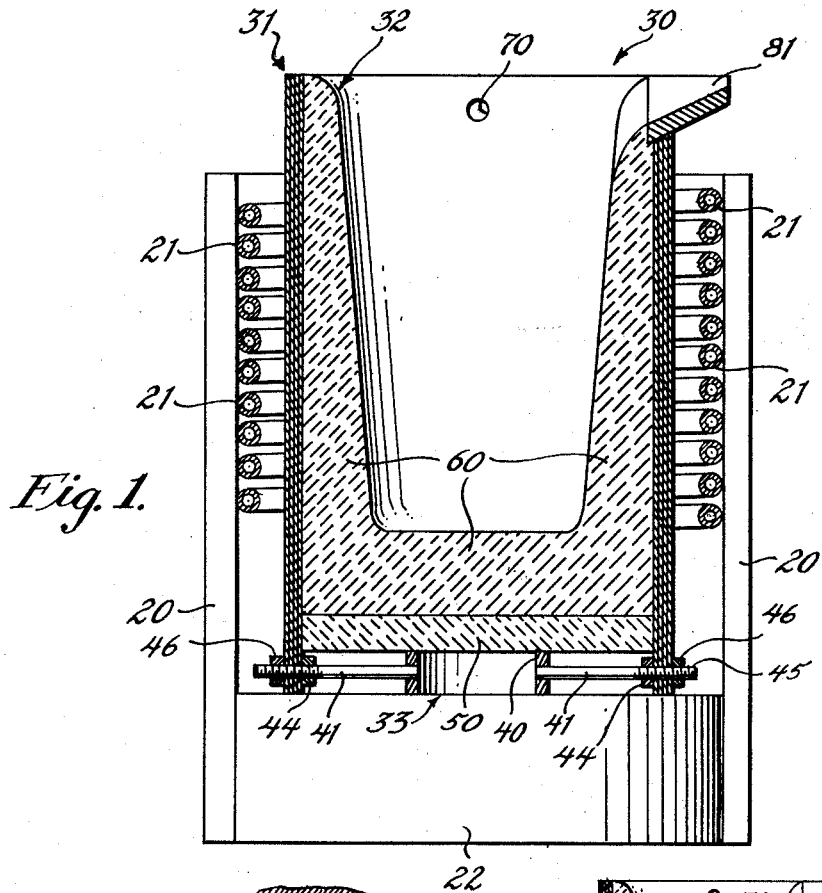
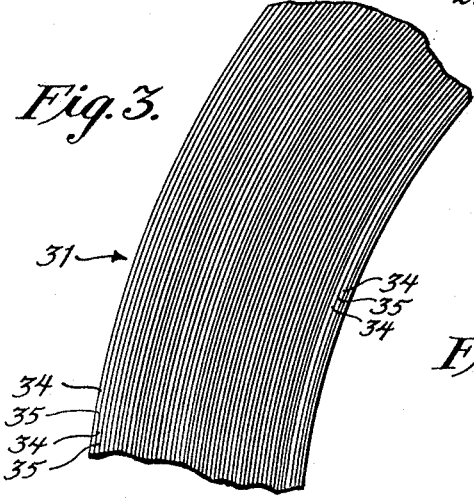
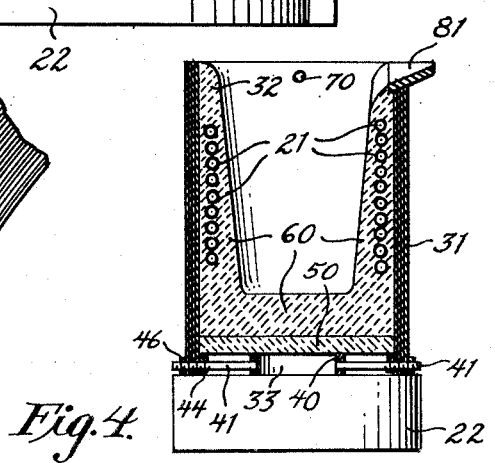
INVENTOR
DONALD JAY ANDERSON
BY
ATTORNEYS

United States Patent Office 3,162,710
Patented Dec. 22, 1964

3,162,710
INDUCTION FURNACE WITH REMOVABLE
CRUCIBLE
Donald Jay Anderson, 285 Rhoads Ave.,
Haddonfield, N.J.
Filed July 24, 1962, Ser. No. 212,065
8 Claims. (Cl. 13—27)

This invention pertains to induction furnaces for molten metal and more particularly to an induction furnace with a self-supporting crucible.

A purpose of the invention is to provide an induction furnace which can be used for either ferrous or non-ferrous induction melting having a structurally self-supporting crucible in the furnace which can be used as a self-supporting transporting crucible or ladle.

A further purpose is to provide a crucible which can be used in the furnace for melting the metal and then used for transporting the molten metal to the point of end usage.

A further purpose is to eliminate unnecessary pours after metal is melted in an induction furnace.

A further purpose is to utilize the strength of a metal to provide structural support for a crucible in induction melting.

A further purpose is to utilize a crucible having a supporting structural metal member which is laminated.

A further purpose is to laminate a metal supporting structure by means of an insulated spiral metal wrap.

A further purpose is to obtain from the melting crucible the structural support for the refractory which is customarily provided by the furnace proper.

A further purpose is to utilize the inherent structural strength of a circular supporting structure in place of the fabricated and reinforced frame of an induction furnace.

A further purpose is to provide for the use of one furnace for the melting of many possible alloys without contamination.

A further purpose is to separate the heating and structural elements of a furnace.

A further purpose is to eliminate the necessity of insulating and packing induction heating coils.

A further purpose is to provide a lining which is an integral part of the crucible and is portable along with the crucible and is not part of the furnace proper.

A further purpose is to utilize a furnace whose stationary parts do not come into direct contact with the crucible.

A further purpose is to provide a structural container capable of being inserted into an induction furnace which can utilize the best available refractory from the standpoint of its refractory qualities with little or no regard to its structural qualities.

A further purpose is to provide a crucible which combines the structural strength of metal with the insulation qualities of an optimum refractory.

In the drawings I have chosen to illustrate a few only of a very wide variety of embodiments of the invention, choosing the forms shown from the standpoints of convenience in illustration, satisfactory operation and clear demonstration of the principles involved.

FIGURE 1 is a vertical elevational section of the furnace of the invention.

FIGURE 3 is an enlarged fragmentary section of the laminated spiral wrap of the invention.

FIGURE 4 is a view similar to FIGURE 1 showing an alternative embodiment of the invention.

Figure 2:
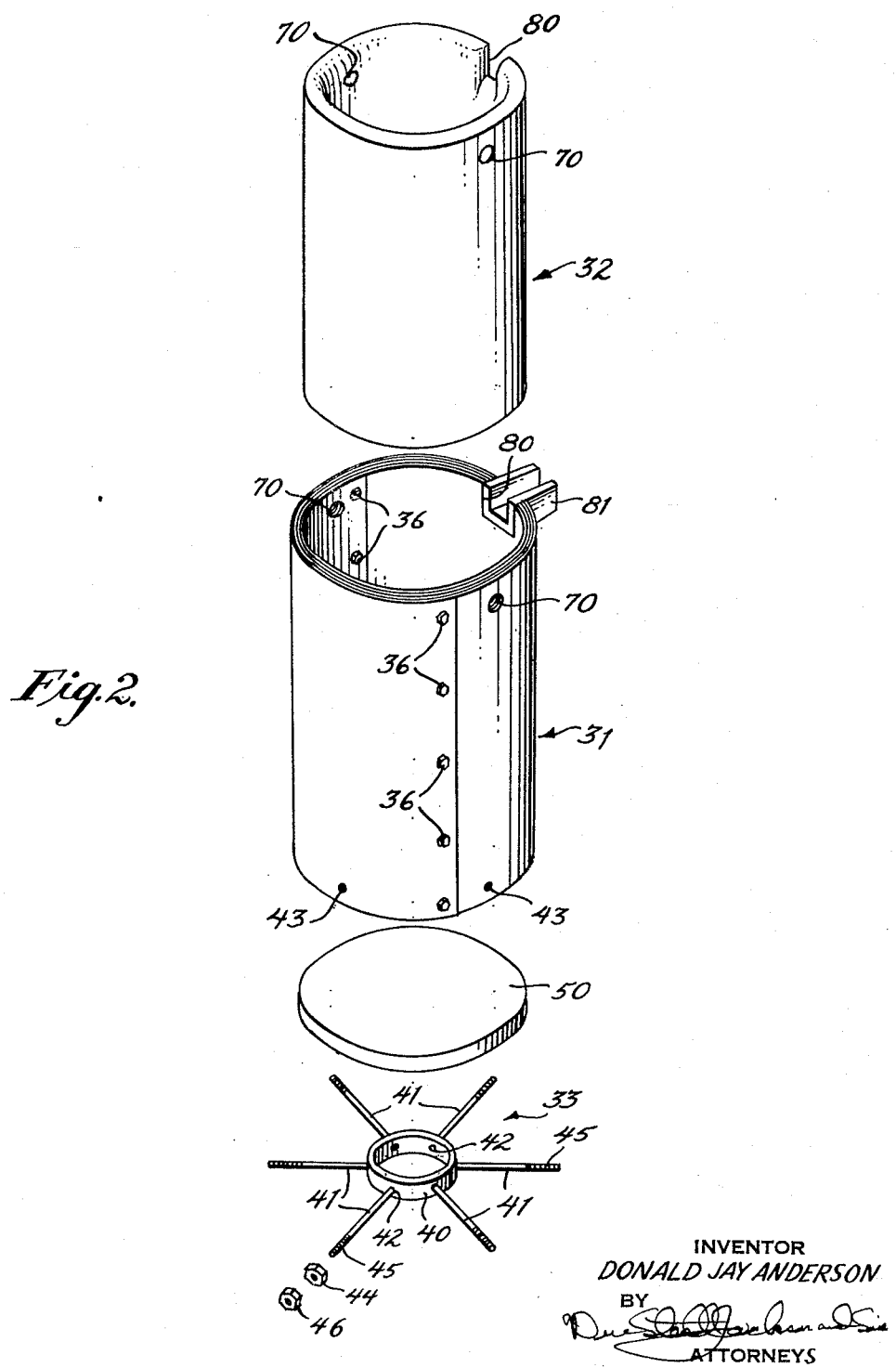
FIGURE 2 is an exploded perspective view of the crucible of the invention.

In the prior art, induction furnaces have contained a built-in crucible formed of refractory packed about an induction coil of, for instance, high conductivity copper. The coil in turn is supported by insulated structural members such as maple or transite. The refractory forms a crucible in which the metal is melted and from which the metal is normally poured into transport ladles.

Attempts in the prior art to provide a furnace having a crucible in which metal could be melted as well as transported in order to eliminate undesirable pours proved unsatisfactory because the refractory was subject to breakage which in turn created a hot metal flow and an extremely dangerous condition. Attempts to reinforce the refractory of a portable crucible with metal failed since the return flux flow in the furnace would soon melt the metal support.

The present invention provides a structure which can be used for melting the metal within the induction furnace and for transporting the metal from the induction furnace.

In the present invention, a furnace with a crucible having a metal support is provided, with the metal support laminated so that the current is broken up whereby no excessive temperatures are created. The lamination takes the form of a spiral wrap which provides structural strength without electrical continuity. The spiral wrap may be of a magnetic or non-magnetic material or may be of a combination of magnetic material and non-magnetic material.

Desirably, the wrap should be formed of a non-magnetic material, since this is not receptive to a flux flow and normally it would be desirable for all of the flux created by the induction coils to be utilized for the melting of the metals. A non-magnetic material is substantially less receptive to a flux flow with the result that losses are minimized. However, there may be applications where it is desirable to utilize magnetic material so that a flux may be selectively diverted where desired through the support which acts as an effective shunt.

A suitable insulation is required between the adjacent faces of the spiral wrap.

It is highly desirable to minimize the number of pours of a molten metal from the furnace to the molds in order to avoid a loss of temperature of the molten metal, a contamination of the molten metal, and in many instances increased oxidation through inclusion of air bubbles in the mold. In addition, there is a problem of slag or scum floating on the surface of melt which when broken up into small particles becomes intermingled with the molten metal causing undesirable inclusions.

All these disadvantages enumerated above are magnified by a transfer of the molten metal from one container into another container. From an optimum standpoint, best results are obtained where the metal is transported to its end use in the same container that was used to melt the metal in the furnace.

Referring to the drawings, coil supports 20 as well known in the prior art, suitably of maple or transite and acting as vertical abutments, are circumferentially spaced about the furnace as well known.

A water cooled induction coil 21 supported by the coil supports 20 is helically wound and is suitably connected to a source of voltage. Suitable water connections, both inlet and outlet, providing cooling water for the induction coil 21 are made to the coil in a manner well known. A pigging block 22 of refractory material having suitable cavities to catch and freeze any molten metal accidentally discharged is positioned at the base of the furnace.

It should be understood that the furnace structure above described is merely illustrative and that any form of furnace which provides for mounting an induction coil may be used.

The crucible 30 of desirably cylindrical form has an outer metal wrap 31, an inner refractory 32 and a bottom structure 33. The outer wrap 31 is comprised of metallic laminations as best seen in FIGURE 3. In a desirable form, suitable metallic sheet 34 of either magnetically susceptible or non-magnetic material is formed into a spirally laminated structure having a plurality of turns with an electrical insulation 35 electrically insulating the metallic turns.

Desirably, the metallic sheet 34 should be formed of a non-magnetic material since this is not receptive to a flux flow. Normally, it is desirable for all of the flux created by the induction coils to be utilized for the melting of the metals in the crucible. A non-magnetic material is substantially less receptive to a flux flow with result that losses are minimized. However, there may be applications where it is desirable to utilize magnetic material so that a flux may be selectively diverted where desired through the wrap 31 which acts as an effective shunt.

This electrical insulation 35 may be of any suitable material. It may be in the form of a sprayed on type, for instance, an aluminum oxide, zirconium silicate, zirconium oxide as well as chrome oxide or spinel. These coatings can be applied by heating the end of a ceramic rod and projecting the molten particles of this rod at high velocity against the metal wrap as it is being wound into a spiral. The coatings upon reaching the prepared metallic surface, which may take the form of a roughened surface, adhere and solidify. The coating provides a suitable electric insulation between the wraps of the metal sheet.

Alternatively, the laminated outer wrap 31 could be composed of a spiral cross section in which the alternating layers of metal and insulation are formed by laying in a blanket of insulation between the metallic spiral wrap. A blanket could take the form of short stable ceramic fibers of, for instance, aluminum oxide, which are interlocked into a flexible, easily handled, inorganic blanket.

In some instances, it may be permissible to use a coating of oxide, for example, a rust formation on the metallic sheet 34, as insulating material 35.

The spiral wrap 31 is secured at its end by any suitable insulating clamping arrangement, such as a pin 36 of electrically non-conducting material which passes through a radially extending hole through the wrap and which can have suitable expanded portions at each end to prevent dislocation of the pin.

The bottom structure 33 is formed of a metallic ring 40 having radially extending rods 41 which connect to the ring at 42 and extend through the metal wrap at openings 43.

The rods 41 extend out through the holes 43 which are suitably insulated as, for instance, by an electrically non-conducting bushing. Lock nuts 44 are threaded on rods 41 at threads 45 inside the spiral wrap and lock nuts 46 are threaded onto the rod 41 at 45 outside the spiral wrap, thus serving to securely position the rod 41 to the wrap. The locking nuts 44 and 45 are electrically insulated from the wrap 31 by a suitable insulating washer or the like. A plate 50 conforming in shape to the inner contour of the wrap 31 rests on the ring 40 to provide a bottom closure for the crucible. The plate 50 is suitably of an insulating material such as transite, but may permissibly be of metal where the plate is sufficiently removed from the heating effects of the magnetic field. Refractory packing is rammed into the cylinder formed by the spiral wrap 31 and the bottom plate 50. This refractory may be of any suitable type as well known in the furnace art.

Lifting holes 70 extend through the spiral wrap and through the packing 60 in a radial direction. These lifting holes are adapted to receive hooks or the like from lifting cranes used to transport the crucible. It should be understood, of course, that these lifting holes are suitably insulated so that the hook or the like projecting through the holes does not short out and create electrical contacts between turns of the spiral wrap. A spout opening 80 is formed in the refractory and in the wrap and a preformed refractory pouring spout 81 is inserted in the opening 80.

In operation, the crucible of the invention containing the charge to be melted is placed within the induction coil and suitable electrical energy supplied to the coils and a flux path is created. The coils are cooled by flowing water internally of the coils. Because of the laminated structure of the wrap 31, the laminated wrap breaks up the current which is induced by the flux and no excessive temperatures are created in the wrap. The flux creates current in the charge and the melting begins. When the melt is complete, the current into the induction coils 21 is turned off and a crane or other lifting mechanism is brought into engagement with the crucible. Lifting hooks or the like engage the lifting holes 70 and the entire crucible is removed and taken to the mold area where the pour is made. The crucible is then ready to be returned to the induction coils for a new charge.

It should be understood that a plurality of crucibles may be used individually with the same induction coils of a furnace to avoid contamination when using different charges.

In a further embodiment of the invention it may be desirable to place the induction coils within the refractory itself, as shown in FIGURE 4. In this embodiment the furnace and crucible are essentially integral with the coils 21 within the wrap 31. Suitable leads for electrical power and cooling liquid flow are brought out through the wrap 31, the leads and conduits being electrically insulated from the wrap to avoid creating an electrical path for current flow.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In an induction furnace, an electrical coil adapted to impart flux to the furnace, support structure for the said coils, a crucible within the coil comprising a cylindrical laminated metallic wrap formed of a spirally wound sheet, electrical insulation between turns of the spiral, and a refractory within the wrap.

2. A furnace of claim 1, in combination with electrically insulated retaining means for preventing the wrap from unwinding.

3. A furnace of claim 1, in combination with a bottom support in the crucible comprising a support element within the wrap, radially extending spokes extending from the support element and engaging the wrap and electrically insulated connections for connecting the spokes to the wrap.

4. In a crucible adapted for use with a magnetic field, a cylindrical laminated metallic wrap formed of a spirally wound sheet, electrical insulation between turns of the spiral, and a refractory within the wrap.

5. A crucible of claim 4, in combination with electrically insulated retaining means for preventing the wrap from unwinding.

6. In an induction furnace, an electrical coil adapted to impart flux to the furnace, support structure for the said coil, refractory supported by the coil and forming a crucible, and a cylindrical laminated metallic wrap formed of a spirally wound sheet surrounding the refractory and the coil, and electrical insulation between turns of the spiral.

7. A furnace of claim 6, in combination with electrically insulated retaining means for preventing the wrap from unwinding.

8. A furnace of claim 7, in combination with a bottom support in the crucible comprising a support element within the wrap, radially extending spokes extending from the support element and engaging the wrap and electrically insulated connections for connecting the spokes to the wrap.

References Cited in the file of this patent

UNITED STATES PATENTS

| | | |
|---|---|---|
| 2,269,726 | Martin | Jan. 13, 1942 |
| 2,672,550 | Vaughan | Mar. 16, 1954 |
| 2,868,938 | Barfield et al. | Jan. 13, 1959 |
| 2,969,411 | Gibbs | Jan. 24, 1961 |
| 2,997,512 | Tama | Aug. 22, 1961 |
| 3,004,091 | Tama et al. | Oct. 10, 1961 |

FOREIGN PATENTS

| | | |
|---|---|---|
| 523,785 | Great Britain | July 23, 1940 |